United States Patent [19]

(12) United States Patent
Calderon et al.

(10) Patent No.: US 11,716,499 B2
(45) Date of Patent: Aug. 1, 2023

(54) NON-INTRUSIVE CLOUD BASED MULTI-SCREEN MEDIA ADVERTISING PLATFORM

(71) Applicants: Antonio A. Calderon, Miami, FL (US); Giovanni Punzo, Miami, FL (US); Ilija Jovelvsky, Miami, FL (US)

(72) Inventors: Antonio A. Calderon, Miami, FL (US); Giovanni Punzo, Miami, FL (US); Ilija Jovelvsky, Miami, FL (US)

(73) Assignee: Streann Media Inc., Miami, FL (US)

( * ) Notice: Subject to any disclaimer, the term of this patent is extended or adjusted under 35 U.S.C. 154(b) by 0 days.

(21) Appl. No.: 15/839,889

(22) Filed: Dec. 13, 2017

(65) Prior Publication Data
US 2022/0182706 A1    Jun. 9, 2022

(51) Int. Cl.
*H04N 21/431* (2011.01)
*H04N 21/81* (2011.01)
*H04N 21/41* (2011.01)
*G06T 11/00* (2006.01)

(52) U.S. Cl.
CPC ......... *H04N 21/4312* (2013.01); *G06T 11/00* (2013.01); *H04N 21/4126* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 9,247,313 | B1* | 1/2016 | Lewis | H04N 21/44004 |
| 10,194,204 | B1* | 1/2019 | Don | H04N 21/44213 |
| 10,447,768 | B1* | 10/2019 | Parekh | H04N 21/812 |
| 2008/0155538 | A1* | 6/2008 | Pappas | G09B 7/04 |
| | | | | 718/100 |
| 2012/0167135 | A1* | 6/2012 | Yu | H04N 21/458 |
| | | | | 725/35 |
| 2015/0026718 | A1* | 1/2015 | Seyller | H04N 21/854 |
| | | | | 725/34 |
| 2016/0182923 | A1* | 6/2016 | Higgs | H04H 20/93 |
| | | | | 725/34 |
| 2018/0139405 | A1* | 5/2018 | Baek | H04N 21/42204 |
| 2019/0028758 | A1* | 1/2019 | Talvensaari | H04N 21/47202 |

* cited by examiner

Primary Examiner — Jason K Lin (57) ABSTRACT

Methods useful for non-intrusive advertising on a mobile wireless communications terminal and web are disclosed. A method may include displaying on a display screen of the mobile wireless communications terminal or the web, according to a timed schedule, advertising images. A method may include advertising images waiting for mandatory interaction from the viewer. One embodiment of the present invention includes still images displayed alongside the main video player that morph into moving images upon predefined, obligatory action from the viewer that helps the advertisement develop entirely. This interactive advertising helps marketers promote their brand and increase brand exposure.

4 Claims, 13 Drawing Sheets

```
{
    "_id":"599235d92cdcf6c64bcf59a3",
    "_class":"com.media.streann.core.domain.InsideAd",
    "name":"Name of the ad",
    "type":"touch_to_hide",
    "background_image":"https://",
    "elements":[
        {
            "image":"https://",
            "positionX":100,
            "positionY":100,
            "moveable":true,
            "endPositionX":400,
            "startPositionY":200,
        },
        {
            "image":"https://",
            "positionX":200,
            "positionY":40,
            "moveable":false,
            "endPositionX":-1,
            "startPositionY":-1
        }
    ],
    "end":"",
    "url":"",
    "resellerId":"XXX",
    "showCloseButtonAfterSeconds":15,
    "durationInSeconds":45,
    "clickActionURL":"ads_url",
    "lastModifiedBy":"admin",
    "createdBy":"admin",
    "createdDate":"2017-08-14T23:44:25.913+0000",
    "lastModifiedBy":"admin",
    "lastModifiedDate":"2017-08-14T23:44:25.913+0000"
}
```

**FIG. 3
JSON FLOWCHART**

FIG. 4
(Inside-Ad Desktop Mode)

FIG. 5
(Inside-Ad Smartphone Landscape Mode)
A: Idle Ad Player Status

B: Non-Intrusive On-Screen Ad along with Main program player status

FIG. 6
(Inside-Ad)
A: Idle Ad Player Status

B: Non-Intrusive On-Screen Ad along with Main program player status

FIG. 7
(Inside-Ad)
A: Idle Ad Player Status

B: Non-Intrusive On-Screen Ad along with Main program player status

FIG. 8
(Inside-Ad)
A: Idle Ad Player Status

B: Non-Intrusive On-Screen Ad along with Main program player status

FIG. 9
(Inside-Ad)
A: Idle Ad Player Status

B: Non-Intrusive On-Screen Ad along with Main program player status

FIG. 10
(Inside-Ad)
A: Idle Ad Player Status

B: Non-Intrusive On-Screen Ad along with Main program player status

FIG. 11
(Inside-Ad)
A: Idle Ad Player Status

B: Non-Intrusive On-Screen Ad along with Main program player status

FIG. 12
(Inside-Ad)

A: IDLE Ad Player Status

B: Non-Intrusive On-Screen Ad with interactive Ad-Shape Mutation Player Status

FIG. 13
(Inside-Ad)
A: IDLE Ad Player Status

B: Non-Intrusive On-Screen Ad with interactive augmented reality Player Status

NON-INTRUSIVE CLOUD BASED MULTI-SCREEN MEDIA ADVERTISING PLATFORM

BACKGROUND

This invention relates generally to the field of Internet advertising. It represents a method of displaying an Internet multi-screen media advertisement or more specifically, inside advertisement displayed alongside the main video stream according to a timed schedule and controlled entirely by a particular action from the viewer.

Internet advertising or web advertising refers to a marketing and advertising method that uses the Internet to promote a certain message, idea, and concept Advertising on the Internet television or through other traditional and/or digital media creates, builds and grows brands. It is so widely used in nearly all industry sectors that it is completely impossible for one to visit a webpage, watch and/or listen to streamed media without being distracted, mainly unwanted, by a certain form of advertisement. This form of marketing is considered to be one Cl the most effective ways for businesses of all sizes to expand their reach, find new customer, and increase their revenue. However, not only businesses benefit from advertising; website operators and networks also find themselves in a position to rely on advertising as their primary means of revenue. Advertisements generate revenues for networks, and sales and brand exposure for companies which provide a product and/or service. There are many different models of generating Internet revenue.

Furthermore, currently mobile wireless communications terminals such as cellular telephones, personal digital assistants, navigation devices, mapping devices, and other mobile wireless communication devices can be found virtually everywhere, in the United States and in the entire world. For a long period of time, entities with products or services to sell have recognized a great potential in using these mobile devices as a channel to advertise their products or services. Problems exist, however, in delivery and presentation of advertising in this advertising channel.

Users of mobile devices are forced to watch advertisements before, during, and after watching and/or listening to streamed media and while surfing the Internet. They are all generally intolerant d being required to watch these advertisements. Convenience and speed, among other things, is what users of mobile devices seek.

One of the reasons why users are not tolerant to advertisements is the feeling d intrusion into their lives; they have a sense d not being able b choose how to spend their personal time. It is as if this sudden and surprise advertisement invades their personal space and time. Certainly, there are other reasons, as well.

In the early days of advertising, the most common advertisements were banner ads; these were graphical ads displayed across the top, bottom or sides of a screen. In order to make people's lives easier, technology undergoes constant and very rapid change, thus imposing that same progress dynamic to advertising. The result of such progress is the introduction of more complex advertisements. One such example is the pop-up ad. For the user to be able to read or watch the underlying content, they must close the pop-up window in order to clear the advertisement.

Sadly, with the launch of numerous advertisements, users have become so accustomed to them that they have stopped paying attention to the message that ads convey. Even worse, some of the users have become irritated by the intrusive ads because they drive people's attention away from the quality content. Being forced to perform an action, a click, to be able to return to the content of their choice is perceived as imposed action upon users, and that, it appears is what annoys most of them. As it has already been recognized, the requirement the user to click in order to skip an advertisement is frustrating. However, if there is an interesting interaction between the user and the advertisement, then the ad will definitely get locked in the viewer's memory. In order for the advertisement to remain there, it has to be interesting, fun, and unconventional.

Therefore, there is a need for a new non-intrusive advertising platform. The general object of this novel method Is to create new advertisement standards additional to the existing technology in the video advertising industry.

BRIEF DESCRIPTION OF THE DRAWINGS

The present invention is illustrated by way of example and is not limited to the Figures in which similar references indicate similar elements.

FIG. 5A/5B is a view in smartphone application in landscape mode of the main program video player without advertisement and then with advertisement placed next to the main video player.

FIG. 6A/6B is a view h smartphone application in landscape mode of the main program video player without advertisement and then with advertisement surrounding the main video player.

FIG. 7A/7B is a view in smartphone application in landscape mode of the main program video player without advertisement and then with placed next to the main video player.

FIG. 8A/8B is a view in smartphone application in landscape mode of the main program video player without advertisement and then the advertisement placed next to the main video player.

FIG. 9A/9B Is a view in smartphone application in landscape mode of the main program video player without advertisement and then interactive advertisement placed net to the main video player controlled by voice command from the end user.

FIG. 10A/10B is a view in smartphone application in landscape mode of the main program video player without advertisement and then the advertisement surrounding the main video player.

FIG. 11A/11B is a view in smartphone application in landscape mode of the main program video player without advertisement and then the advertisement placed next to the main video player.

FIG. 12A/12B is a view in smartphone application in landscape mode of the main program video player without advertisement and then with an Interactive mutation of the main program video player as key element of the advertisement FIG. 13A/13B is a view in smartphone application in landscape mode of the main program video player without advertisement and then with an on-screen live end user smartphone mare, that merges augmented really elements in the user environment that drives search and interactivity with advertisement objects wound them.

SUMMARY OF THE INVENTION

Detailed Description of the Invention

Embodiments of the present invention provide a method useful for non-intrusive advertising on a mobile device. It provides a cloud based method for displaying an Internet multi-screen media advertisement or more specifically, Inside advertisement displayed alongside the main video stream according to a timed schedule and controlled entirely by a particular action from the viewer. The method comprises of displaying advertisement that Is shown concurrently with the online video stream called main video player. The invention enables viewers of online video streams to be shown interactive advertisement alongside the main video stream. The advertising content will be visible to a user during a portion of time while the user is watching and/or listening to the content of the main video player. In order to close, skip or move the advertisement, certain action by the viewers is required. Therefore, the invention represents algorithm that creates an interactive advertisement where the user needs to make an action in order to "remove" the advertisement that is displayed. This action is mandatory and is indicated alongside the strippable ad. After the demanded action from the user, the advertising content is no longer visible and the content of the main video player is then fully displayed on the screen. Specifically, the primary object of this non-intrusive cloud based multiscreen media advertising platform is to enable viewers of online video streams to be shown video advertisements that will not interrupt their current viewing. Rather than disrupting the viewing of the video streams, the advertisement is displayed alongside the main video. The content of both, the main video player and the video advertisement is simultaneously displayed without any interference between the two of the streams. This minimizes user irritation because the content of the main video player does not fade away and is fully visible.

Another embodiment of the invention is that it provides a novel concept of presenting advertisements. The advertisement is delivered to viewers of streamed media in a manner that enables them not to lose focus of the content on the main player. The advertisements are simply displayed simultaneously with the main video player thus: the advertising content encompassed in this invention is referred to as Inside advertisements (inside-Ads).

According to an embodiment of the Invention, a method of non-intrusive multiscreen media advertising from internal ad video source is disclosed. The method may include storing, according to a timed schedule, a plurality of files containing data representative of a plurality of advertising images/videos, and selecting, upon occurrence of a predefined event, one of the plurality of files for display alongside the main video.

According to an embodiment of the invention, a method of non-Intrusive multiscreen media advertising from external source is disclosed. The method may include obtaining from external source (VAST, VPAID, GoogieIMA . . . ), according to a timed schedule, a plurality of files containing data representative of a plurality of advertising images/videos, and selecting, upon occurrence of a predefined event, one of the plurality of files for display alongside the main video.

The present invention contemplates part of the screen being occupied by the inside advertisement as a logo, brand symbol, indicia, icon, name or the lice, hereinafter "logo". The logo can change, modify, reconfigure, morph and be transformed by the action performed by the viewer. Use of the logo increases brand exposure and is meant to enhance revenue for the brand owner.

In the following description, for purposes of explanation, various details are set forth in order to provide a thorough understanding of the description of the present invention; they are exemplary and explanatory. It will be appreciated, however, to those skilled in the art that the invention will be practiced without those specific details. Various embodiments of the present invention are disclosed including methods of operation.

Figure 1:
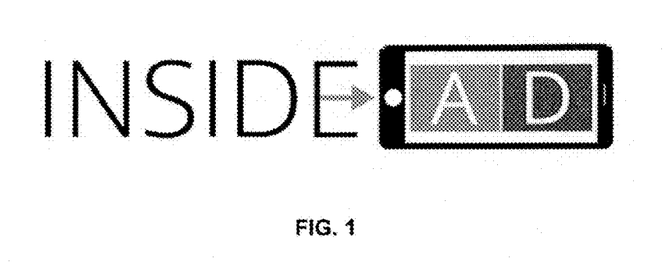
FIG. 1 is flow diagram describing how the dent applications request and receive ads.

FIG. 1 is a flow diagram of a method in accordance with an embodiment of the invention; it depicts how an advertisement i.e. an inside-ad will appear alongside a main video player. The users watch content on the main video player of their choice. While the main video is playing, the application requests whether advertisement should be played. Timer, defined in the admin menu of the application, is used to indicate when new advertising content to be requested from the server. The timed Interval establishes a regular schedule for displaying new advertising content. After the timed interval, the server receives a request from the application for new advertisement. The advertisement sent by the server can be of internal or external source (VAST, VPAID, GoogieIMA . . . ). The application recognizes what type of inside-ad is received (VAST, Local image, Local video, Affiliate Banners, Interstitial). Different type of inside-ads imposes different implementation of the advertisement.

In overview, advertisement characteristics, specifically, the advertisement, and the advertisement campaign (i.e. the series of advertisements sharing the same theme or idea) with which the advertisement is associated are first set.

At the beginning, the inside-ad is created i.e. the advertisement characteristics are defined: name of the inside-ad, after how many seconds the close button will be shown, duration of the advertisement in seconds, load balancing weight (inside-ads with higher weight are more likely to be chosen), action URL (Uniform Resource Locator; this will be opened if the user clicks on the inside-ad), type of the inside-ad (VAST, Local image, Local video, Affiliate Banners and Interstitial), and source of the ad (internal or external).

Regarding the advertisement campaign, there are several filters or characteristics that comprise such a campaign. The first characteristic defines the name of the campaign, campaign weight (campaign with higher weight is more likely to be displayed), start and end time for display of the advertising content (date (DDMMYY) and time (HH:mm)). The second characteristic is the Content to be included in the campaign. The content defines which channel(s) (live, radio, movie), displayed on the main video player, will be accompanied by the advertising content. The next campaign characteristic that must be defined is the Screen. Here it is defined on which screen the advertising content will appear in the client applications; the screen can be Splash (initial screen), Log in with social media screen, Login with username and password screen, new user registration screen, Main content screen, Video Player. Another filter is on which type and device this campaign will be displayed. Possible options are Android, IOS or WEB. The last campaign filter is the choice of inside-ad. In this filter, the predefined inside-ad is chosen and is included in the campaign. When all these fitters are completed, a campaign is created.

Figure 2:
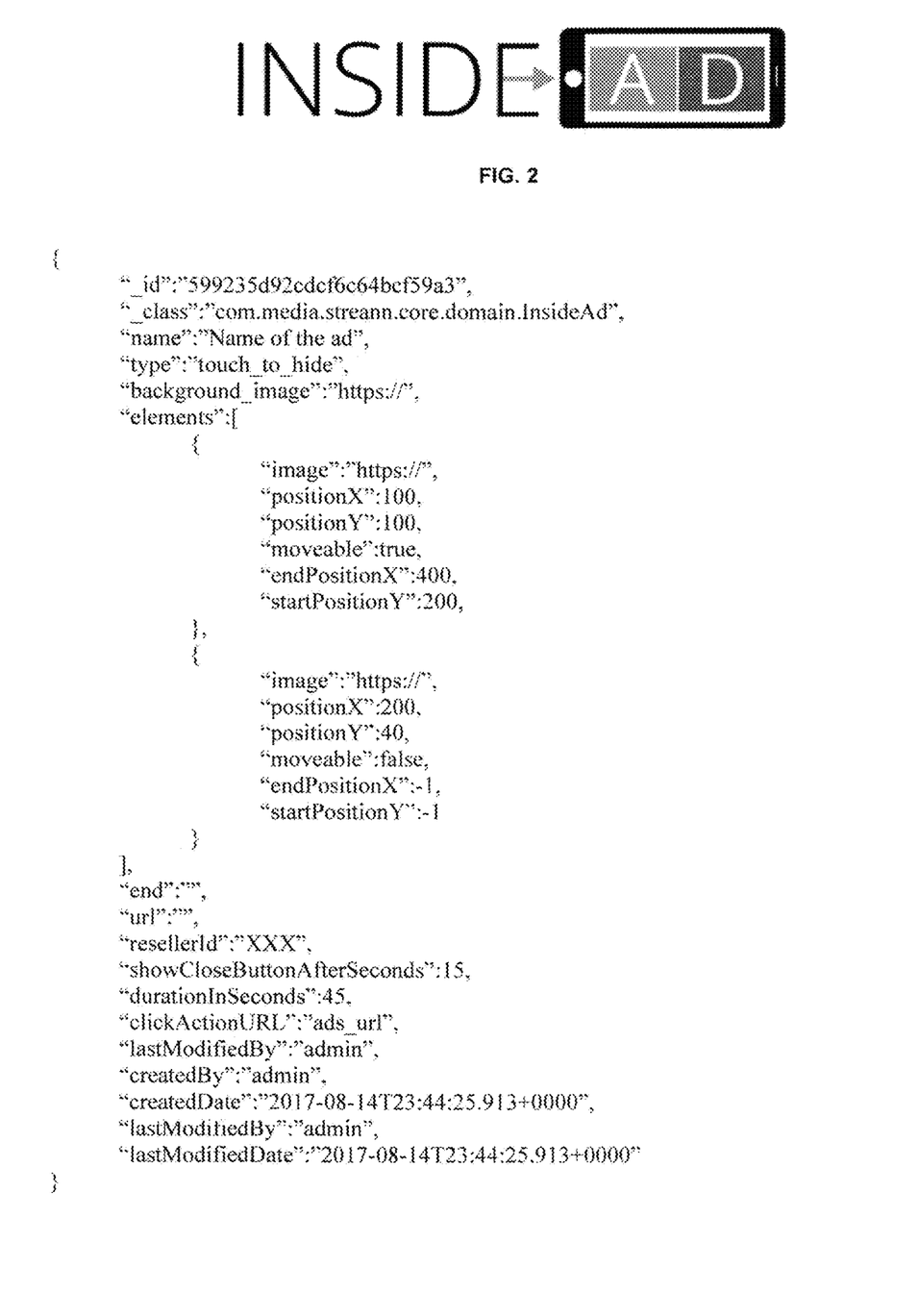
FIG. 2 depicts the inside advertisement in the form of a JSON. The JSON shown in the image contains information for the ad. The information, as can be seen from the image, includes the ID, name of the advertisement, the type of action the user needs to perform in order for the ad to disappear from the screen, start and end point of the action, the direction of the action and duration in seconds.

FIG. 2 are image and flow diagram depicting the inside advertisement in the form of a JSON. According to the embodiments presented herein, the inside advertisements will be shown in the native Android and LOS applications. These applications will send HTTP POST request to the API server. This HTTP POST request contains the ID of the logged in user, if the user is logged in. The HTTP POST request also contains the location of the user. The API server receives the request and processes it. Based on the user and the location, the server chooses an advertisement and returns it to the application. The inside advertisement is returned in JSON format. The application receives the JSON response which contains the inside ad. The JSON also contains data for the ad. This data includes the following: ID, name, duration in seconds, images/videos, type of action that the user needs to perform, start point of the action, end point of the action, the direction (path of the action) etc. The application scales the main video player and places the ad on the screen. As can be seen from the images above, the ad can be placed on the left side of the screen, the right side; it can cover the biggest part of the screen, it can surround the main screen etc. After the inside advertisement is displayed, the application sends HTTP POST request to Inform the server that the Inside ad is shown. The backend then increases the number of impressions. The layout that contains the advertisement is set to listen to touch events when the user touches the screen. The end user needs to follow the description of the ad or the instructions provided in order to close the inside ad so that the main content occupies the entire screen again.

Figure 3:
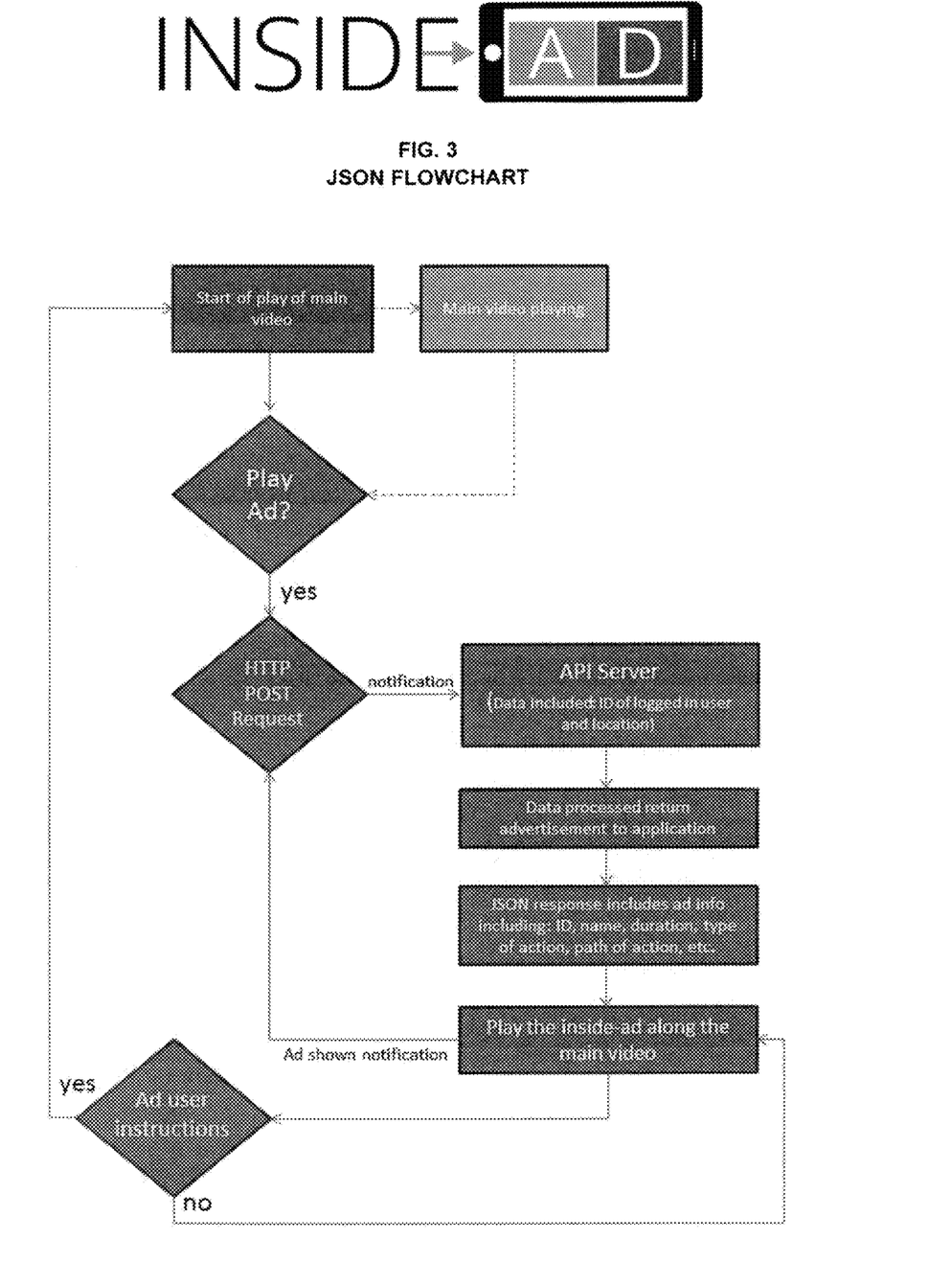
FIG. 3 is a flow diagram of the inside advertisement in the form of a JSON. The JSON shown in the image contains information for the ad. The information, as can be seen from the image, includes the ID, name of the advertisement the type of action the user needs to perform m order for the ad to disappear from the screen, start and end point of the action, the direction of the action and duration in seconds.

FIG. 3 we explain the flow of events and data regarding the inside-ad feature. The whole process starts with the start of the playing of the primary video content player. While the primary player plays the video (regardless of the type of the video), on regular inside-ad intervals (i.e. 1 minute) the inside-ad logic makes the procedure for checking if it should play the additional inside-ad video. This checking process involves in creating and posting HTTP POST request to the backend system (the Inside-Ad API server). The POST request contains the needed user or session identification data that is the ID of the logged in user or the IP address of the client, respectively. The backend system using the identification data decides if there is a inside-ad available for that session and also checks if the user is qualified to receive and view this ad. The backend server compiles a JSON formatted response which includes the ID of the inside-ad that needs to be played, Name of the ad, duration, type of action that needs to be taken after a click on the inside-ad and the path/URL of the click action. After the main player logic receives the affirmative/positive API server response (identified by the JSON content) it starts the play of the inside-ad video content in an additional video window along the primary video content that continues to play. The last check after the inside-ad starts to play is to check if the additional info needs to be displayed in the main player regarding information that an inside-ad is playing in the additional video window. After the inside video player is finished with the ad playing, or it is dismissed by the end user, the Inside-ad procedure ends and it is restarted again in the previously mentioned Inside-ad time interval.

Figure 4:
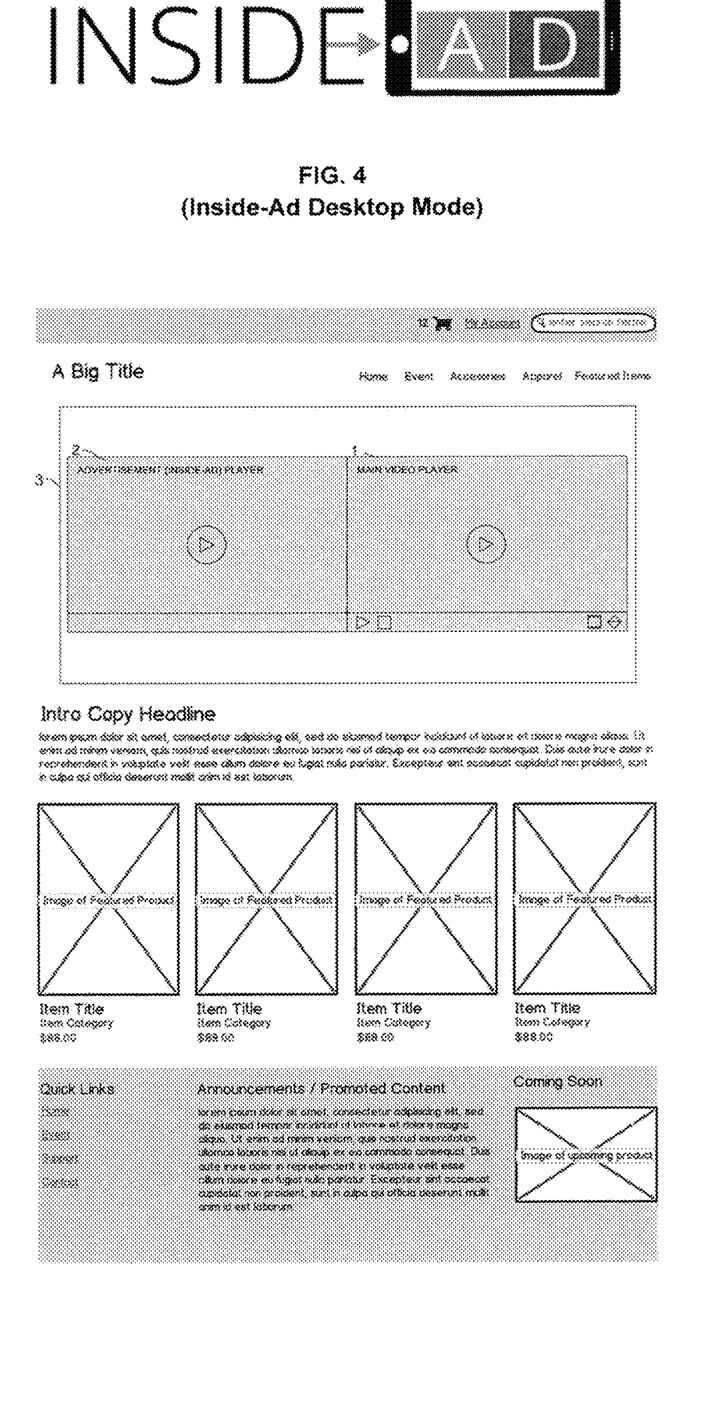
FIG. 4 is a web page view of the advertisement player that appears on the left side of main video player.

FIG. 4 depicts the main video player and the advertisement (inside-ad) player. It is a web page view in landscape i.e. the advertisement (inside-ad) player is placed next to the main video player. This is an example view for demonstration purposes. The inside-ad player can also be placed below the main video player; it can surround the main video player etc. This will be demonstrated in the examples further explained. Prior to the activation of the advertisement (Inside-ad) player, the main video player is the sole occupant of the screen and as such, the primary attraction for the user. At later time, according to a predefined time schedule, appears the inside-ad. As it can be observed in the next figures, the advertising content does not hide the main video player; both contents are visible. Such presentment of advertising content minimizes user irritation because the content of the main video player does not fade away and is fully visible. The inside ad shall be displayed until already defined action, required from the viewer is performed and completed.

Figure 5:
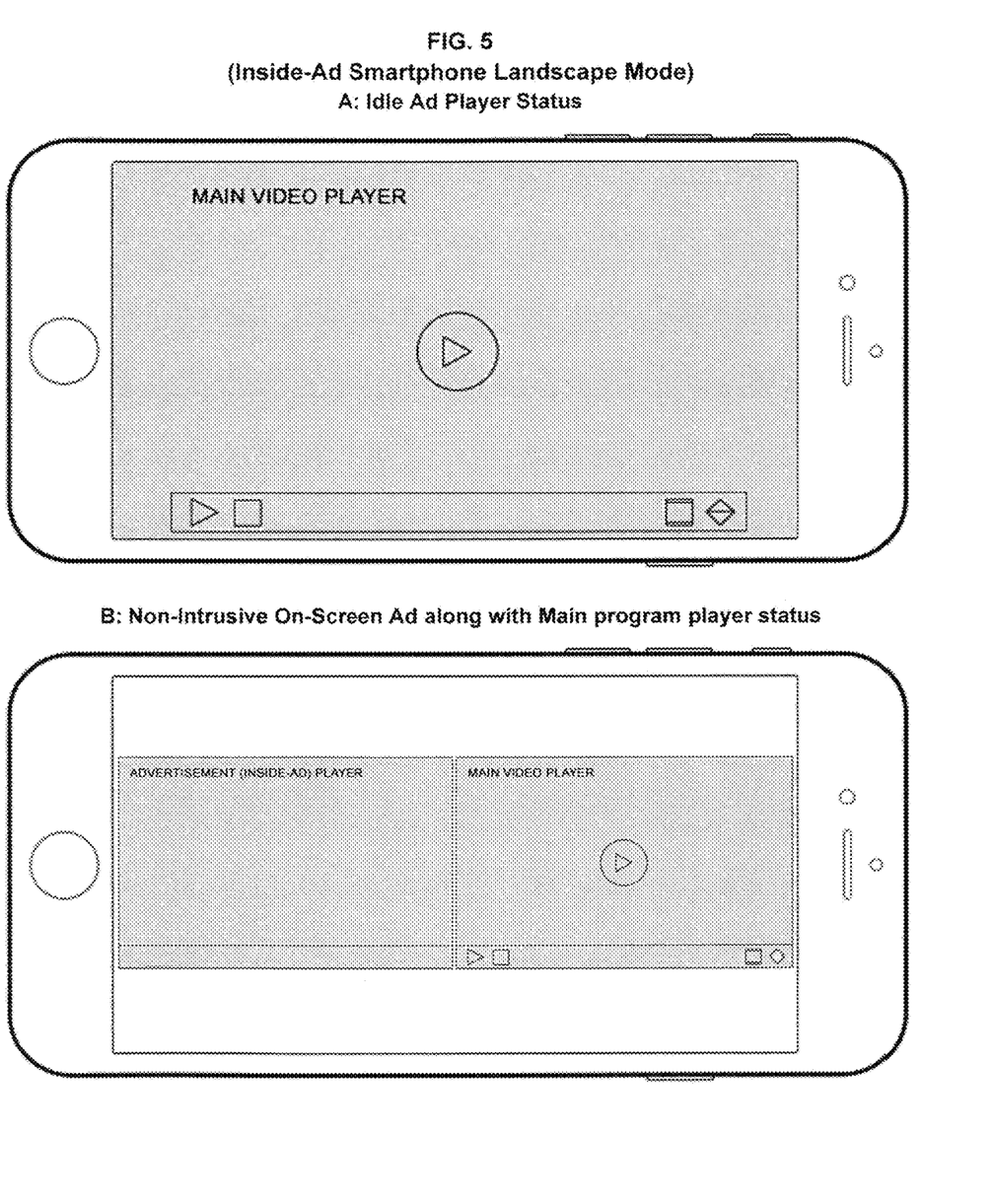

FIG. 5A depicts the main video player occupying the entire screen prior to displaying the advertisement.

FIG. 5B depicts the main video player and the advertisement (inside-ad) player. It is a smartphone view in landscape i.e. the advertisement (inside-ad) player is placed next to the main video player. This is an example view for demonstration purposes. The inside-ad player can also be placed in portrait mode below the main video player, it can surround the main video player etc. This will be demonstrated in the examples further explained. Prior to the activation of the advertisement (inside-ad) player, the main video player is the sole occupant of the screen and as such, the primary attraction for the user. At later time, according to a predefined time schedule, appears the inside-ad. As it can be observed in the next figures, the advertising content does not hide the main video player; both contents are visible. Such presentment of advertising content minimizes user irritation because the content of the main video player does not fade away and is fully visible. The Inside ad shall be displayed until already defined action, required from the viewer is performed and completed.

Figure 6:
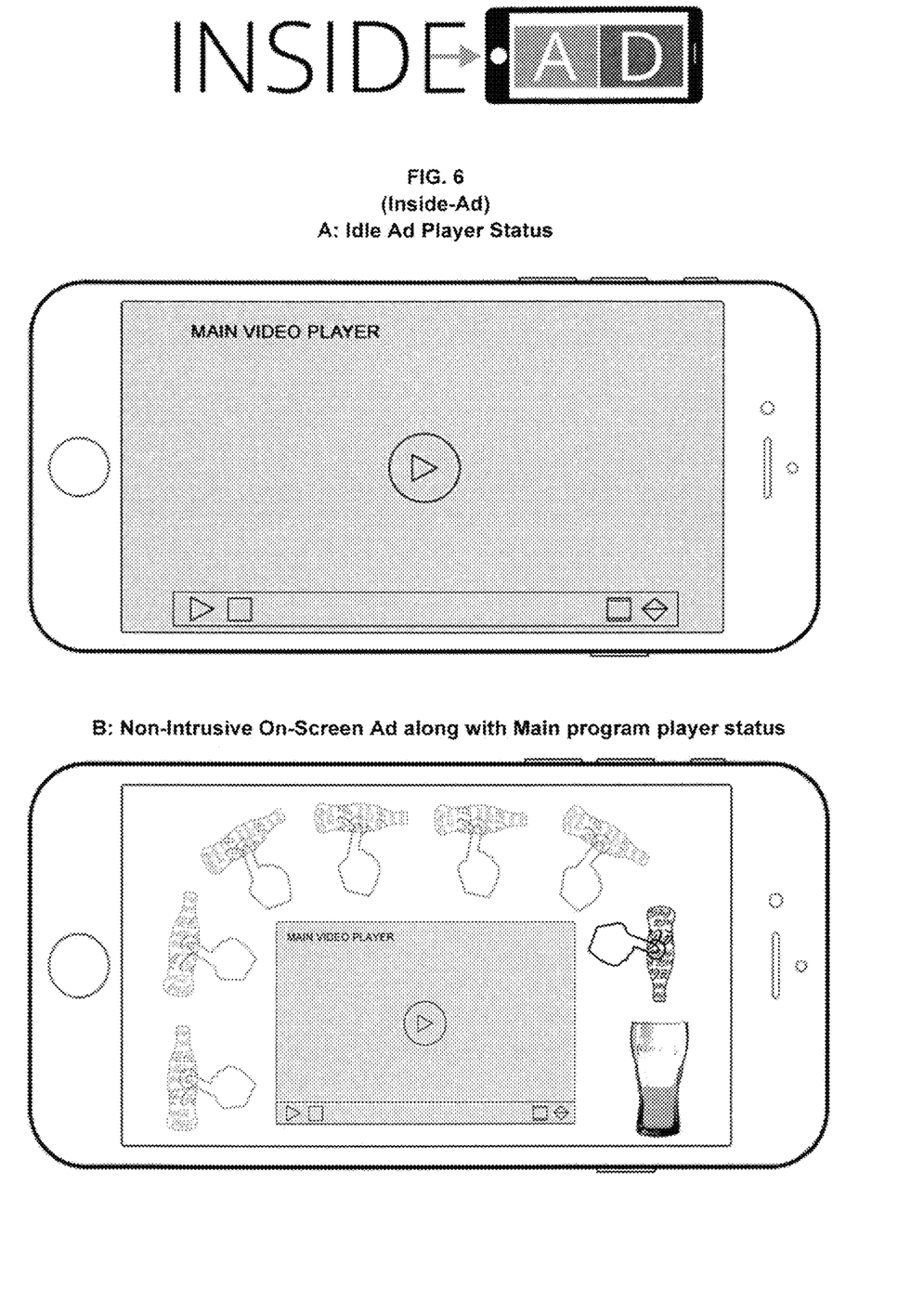

FIG. 6A depicts the main video player occupying the entire screen prior to displaying the advertisement.

FIG. 6B shows an example of interactivity between the advertisement and the user with a bottle with Coca Cola logo and a glass displayed alongside the main video player. The main video player is placed in center position on the screen leaving room for the interactive Coca Cola advertisement. The bottle with Coca Cola logo is placed next to the main video player, in the left corner whereas an empty glass with the logo of Coca Cola is placed next to the main video player but in the right corner. In order for the ad to disappear from the screen, action from the viewer is required. In this case, the viewer touches the Coca Cola bottle and drags it from the left hand corner upwards around the main video player until it reaches the right hand corner. Once the bottle reaches the glass, the viewer drops the bottle so that the contents is poured in the glass. This action defines the end of the ad. As soon as the glass is full, the ad disappears from the screen and the main video player is fully displayed.

Figure 7:
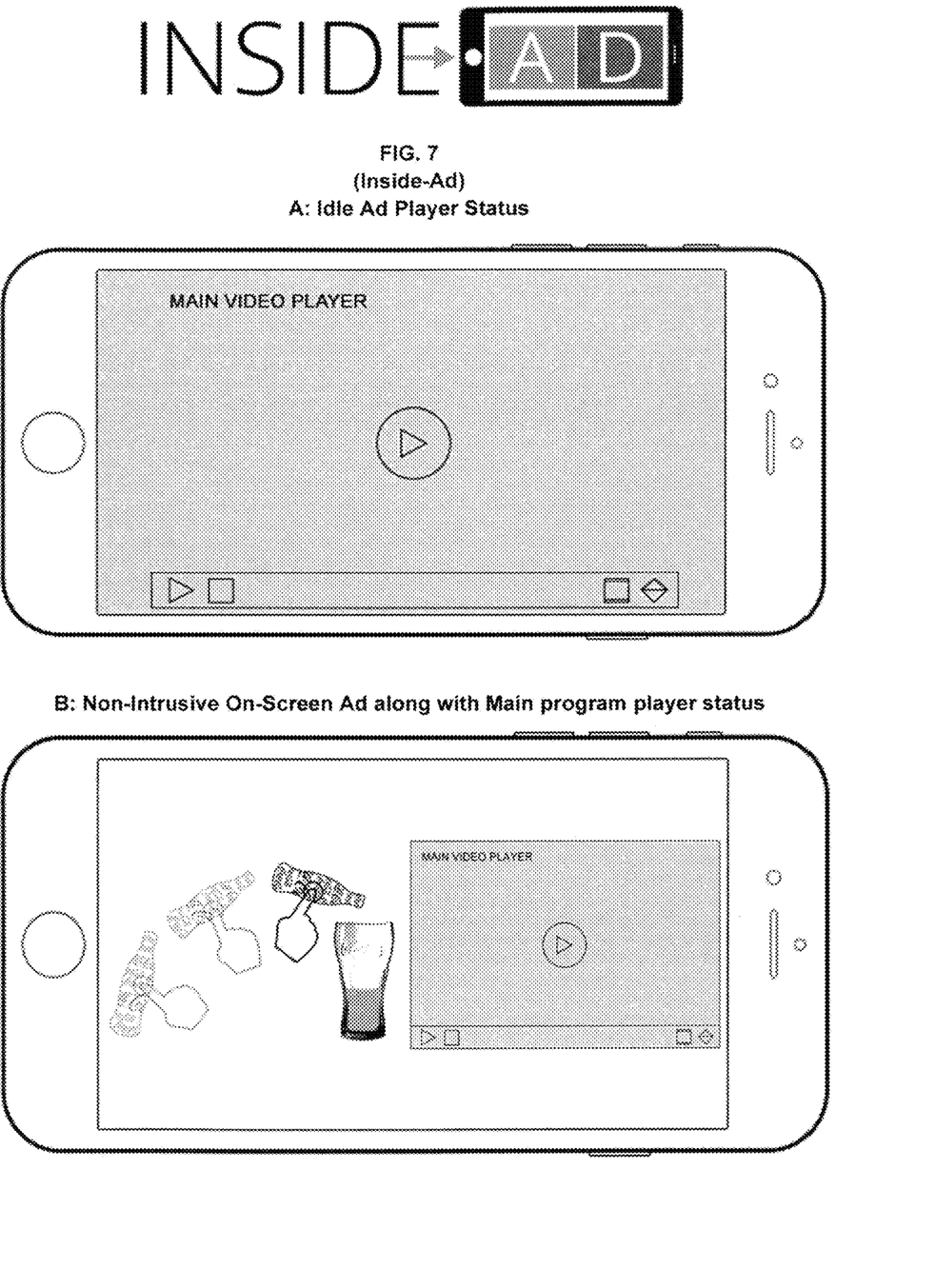

FIG. 7A depicts the main video player occupying the entire screen prior to displaying the advertisement.

FIG. 7B shows an example of interactivity between the advertisement and the user with a bottle with Coca Cola logo and a glass displayed alongside the main video player. The main video player is placed in the right corner on the screen leaving room in the left for the interactive Coca Cola advertisement. In the left corner of the screen there are a Coca Cola bottle and an empty glass. The viewer touches the bottle and drags it towards the empty glass in order to pouf the Coke inside the glass. Once the Coke is dropped inside the empty glass, the ad disappears from the screen and the main video player is fully displayed.

Figure 8:
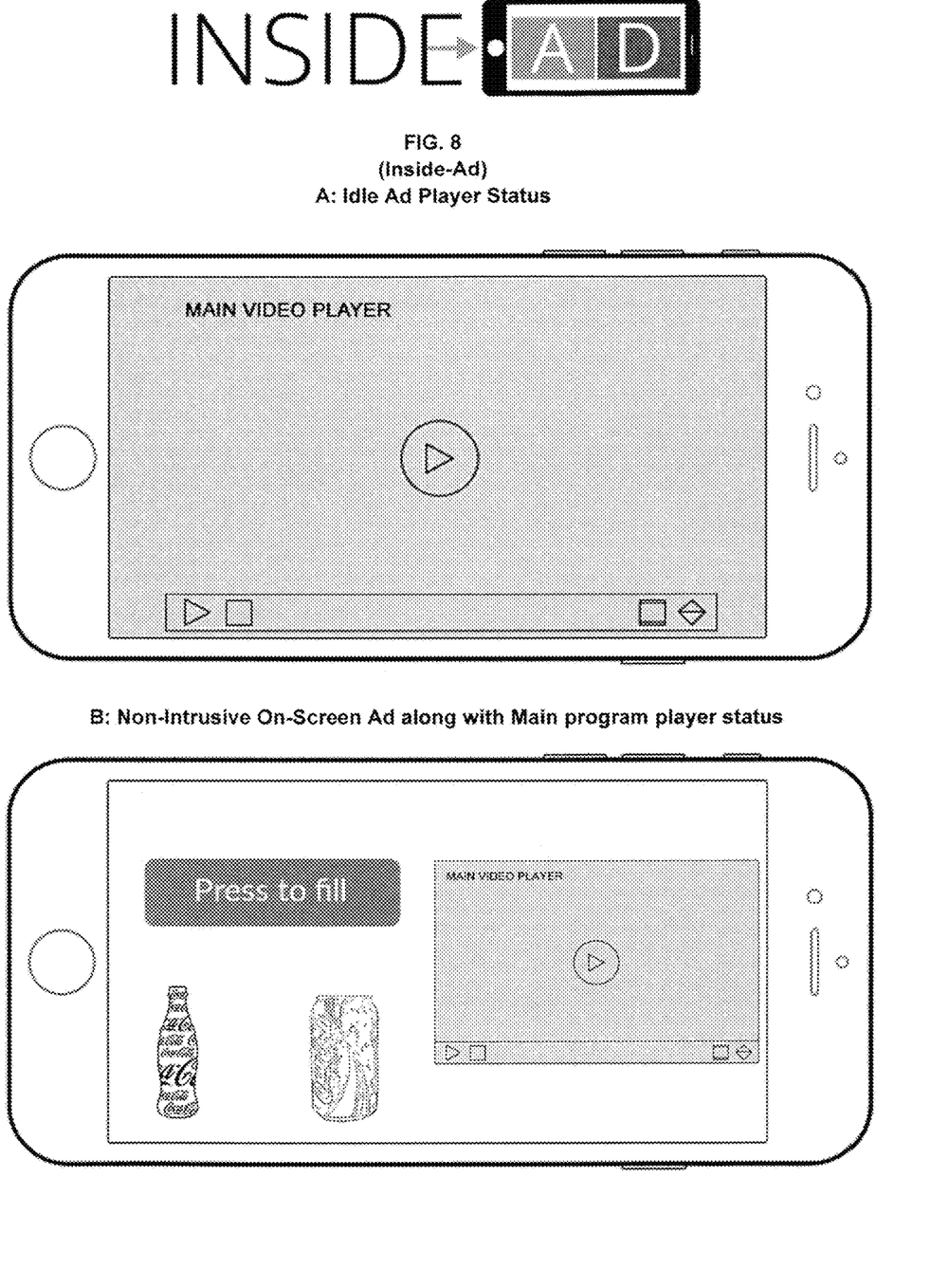

FIG. 8A depicts the main video player occupying the entire screen prior to displaying the advertisement.

FIG. 8B shows an example of interactivity between the advertisement and the user with a bottle with Coca Cola logo and a glass displayed alongside the main video player. The main video player is placed in the left corner on the screen leaving room in the left for the interactive Coca Cola advertisement. In the left corner of the screen there are a Coca Cola bottle and an empty glass. Above the bottle of Coca Cola and the empty glass there is a command indicated. The command is intended for the viewer and tells them how to behave in order to see the inside ad. The command says Trees to fir. When the viewer presses on the indicated spot, the content of the bottle is poured in the empty glass and the ad disappears from the screen. The main video player then occupies the entire screen again, same as prior the inside advertisement.

Figure 9:
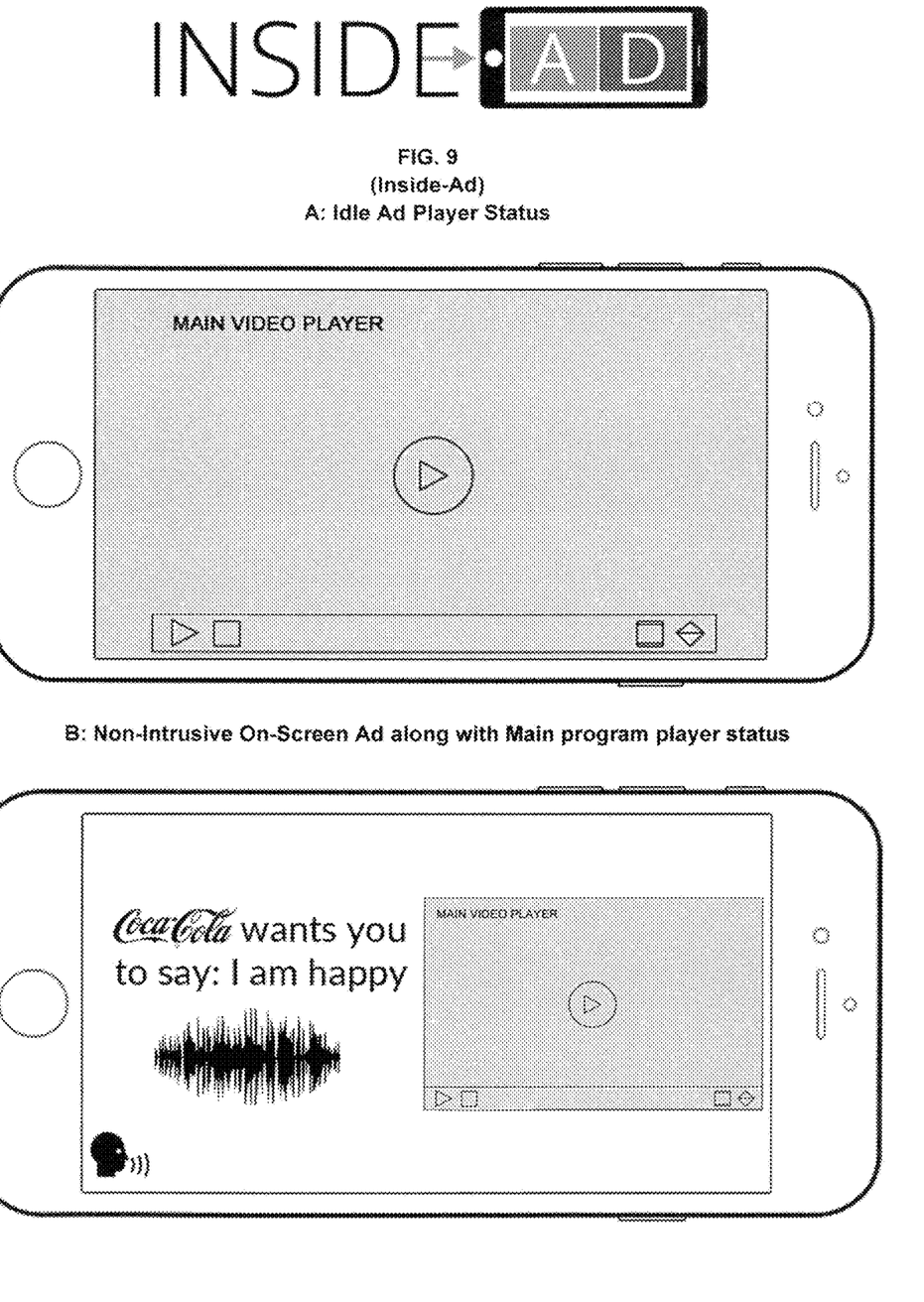

FIG. 9A depicts the main video player occupying the entire screen prior to displaying the advertisement.

FIG. 9B shows an example of interactivity between the advertisement and the user with a bottle with Coca Cola logo and a glass displayed alongside the main video player. The interactivity between the viewer and the ad displayed concurrently with the main video stream is in the form of a voice command. The displayed advertisement "asks" the user to say something in order for the advertisement to be removed from the screen such as: "I am happy". The user says I am happy and the ad goes out upon voice command.

Figure 10:
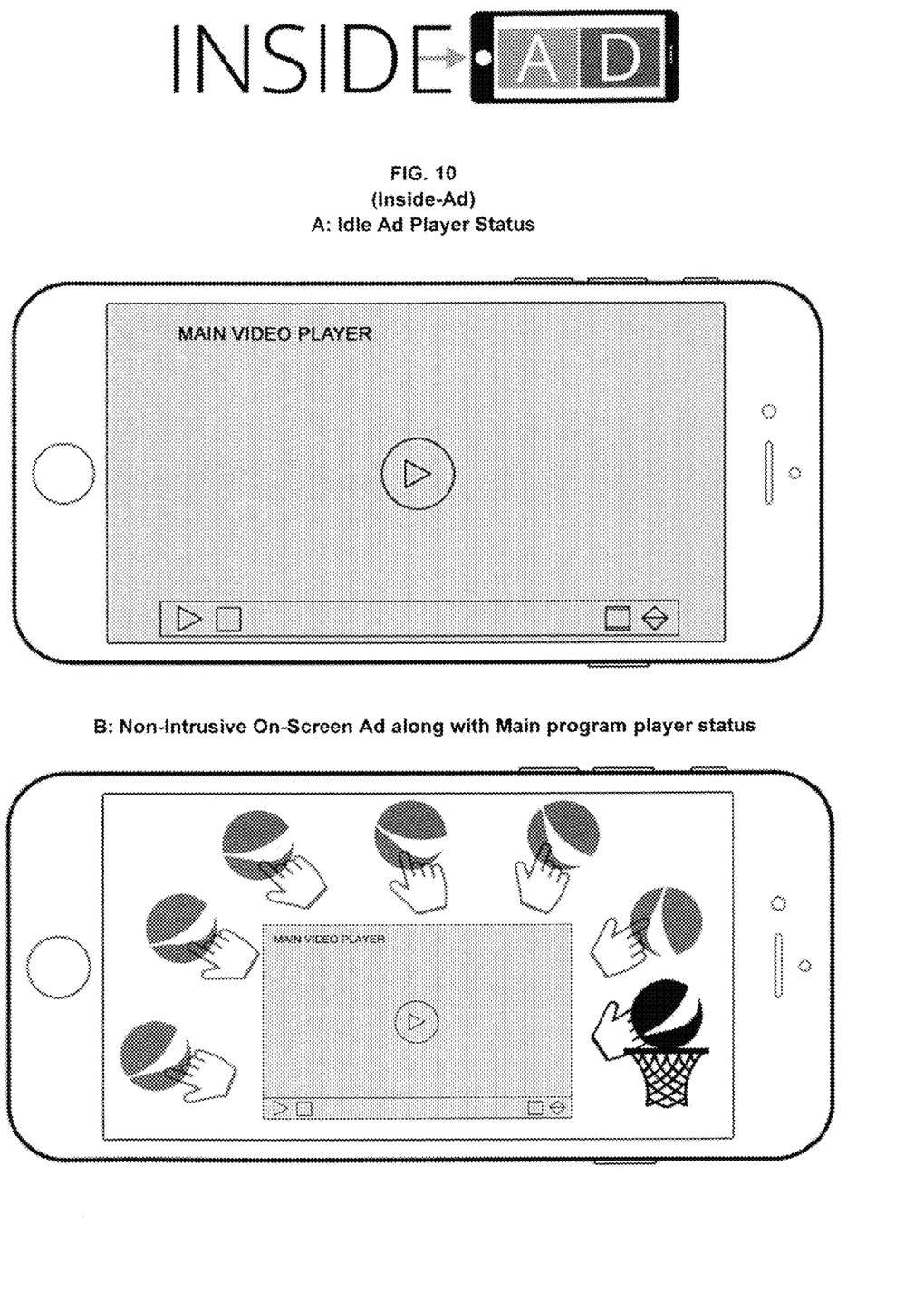

FIG. 10A depicts the main video player occupying the entire screen prior to displaying the advertisement.

FIG. 10B shows an example of interactivity between the advertisement and the user with the Pepsi logo se a basketball and a basketball net displayed alongside the main video player. The main video player is placed in center position an the screen leaving room for the interactive Pepsi advertisement Pepsi logo morphed into a basketball is placed nod to the main video player, in the left corner whereas basketball net is placed next to the main video player but in the right corner. In order for the ad to disappear from the screen, action from the viewer is required. In this case, the viewer needs to drag the Pepsi logo/ball from the left hand corner upwards around the main video player until it reaches the right hand corner. Once the ball reaches the net, the viewer drops the ball in it. This action defines the end of the ad. The advertisement disappears from the screen and the main video player is fully displayed.

Figure 11:
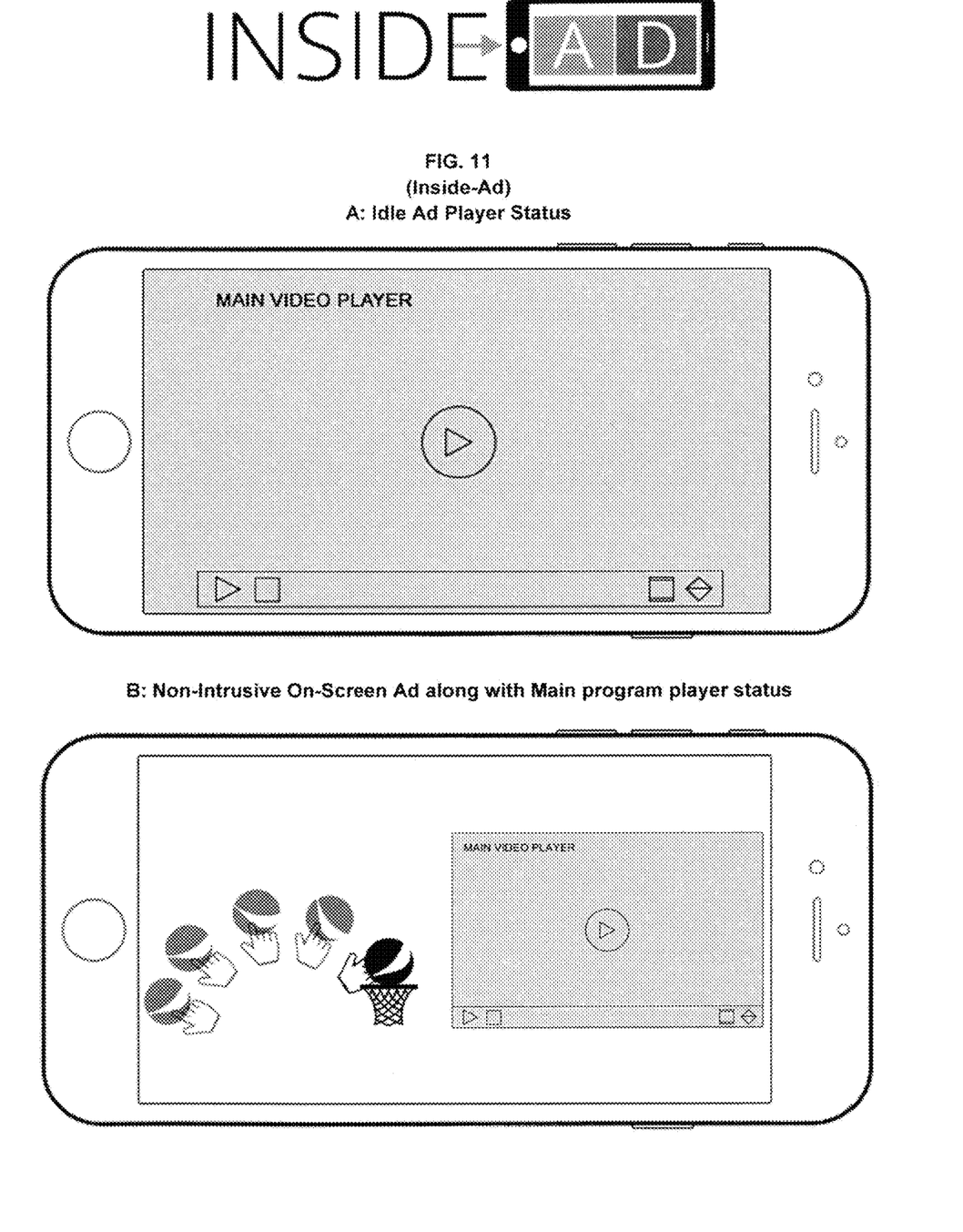

FIG. 11A depicts the main video player occupying the entire screen prior to displaying the advertisement.

FIG. 11B shows an example of interactivity between the main program, advertisement and the user with the Pepsi logo as a basketball and a basketball net displayed alongside the main video player. The main video player is placed in the right corner on the screen leaving room in the left for the interactive Pepsi advertisement. The viewer needs to drag the Pepsi logo morphed into a basketball and drop it in the net. When the Pepsi logo/ball is in the net, the ad disappears from the screen. The main video player then occupies the entire screen again, same as prior the inside-ad advertisement.

Figure 12:
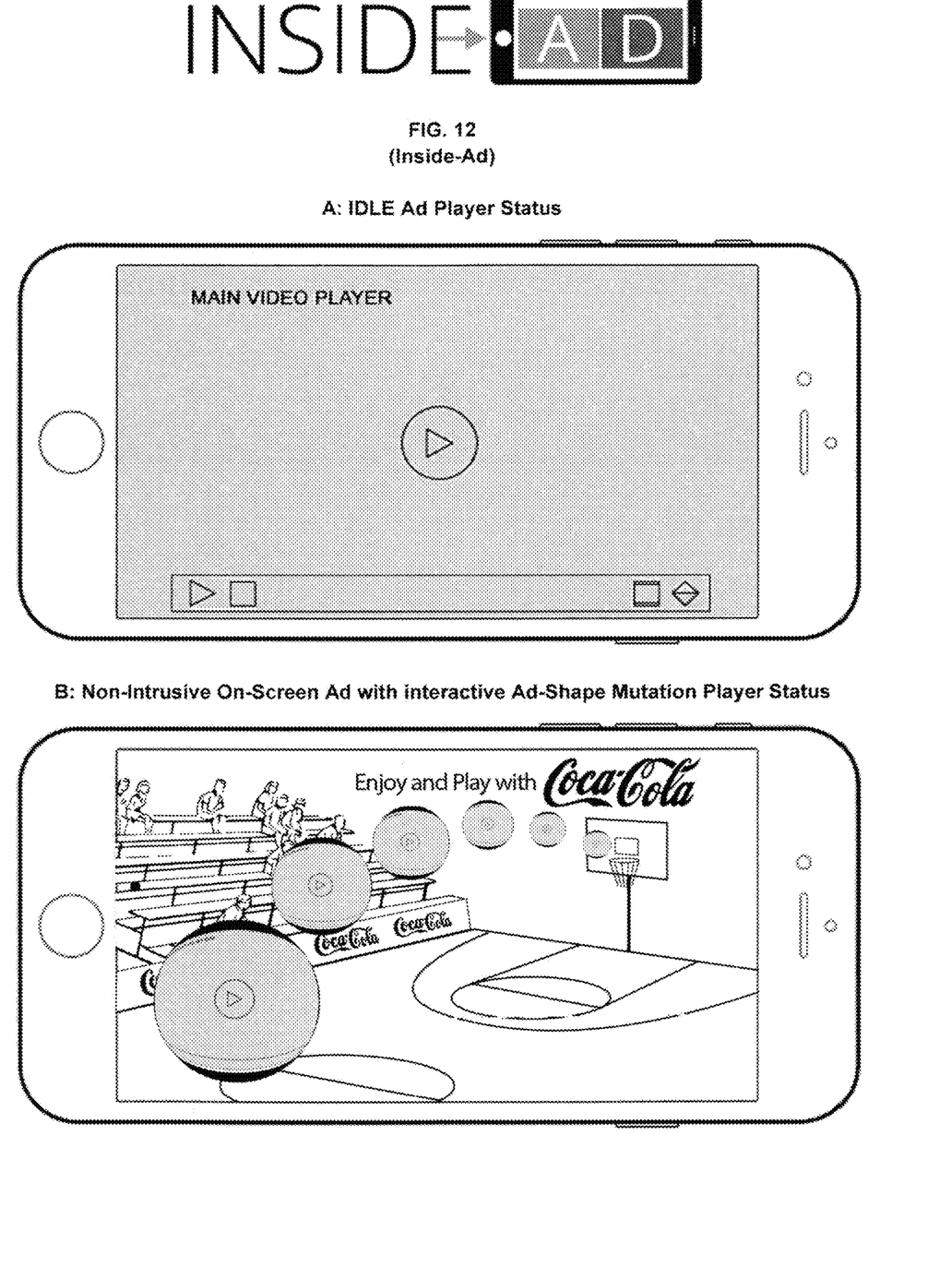

FIG. 12A depicts the main video player occupying the entire screen prior to displaying the advertisement.

FIG. 12B shows an example of interactivity where the mutation of the main video player merges with the advertising elements that are running in the background of the entire screen. In this example, the main video player is playing the main program during the entire time and with the activation of the advertisement, according to a predefined time schedule, the main video player starts to adopt the shape of the advertisement which in the example provided is a basketball. During this process, the entire screen background starts to reveal a basketball court from Coca Cola. The viewer needs to drag the main video player morphed into a basketball and drop it in the net. When the main video player/ball is in the net, the main video player then occupies the entire screen again, same as prior the inside-ad advertisement.

Figure 13:
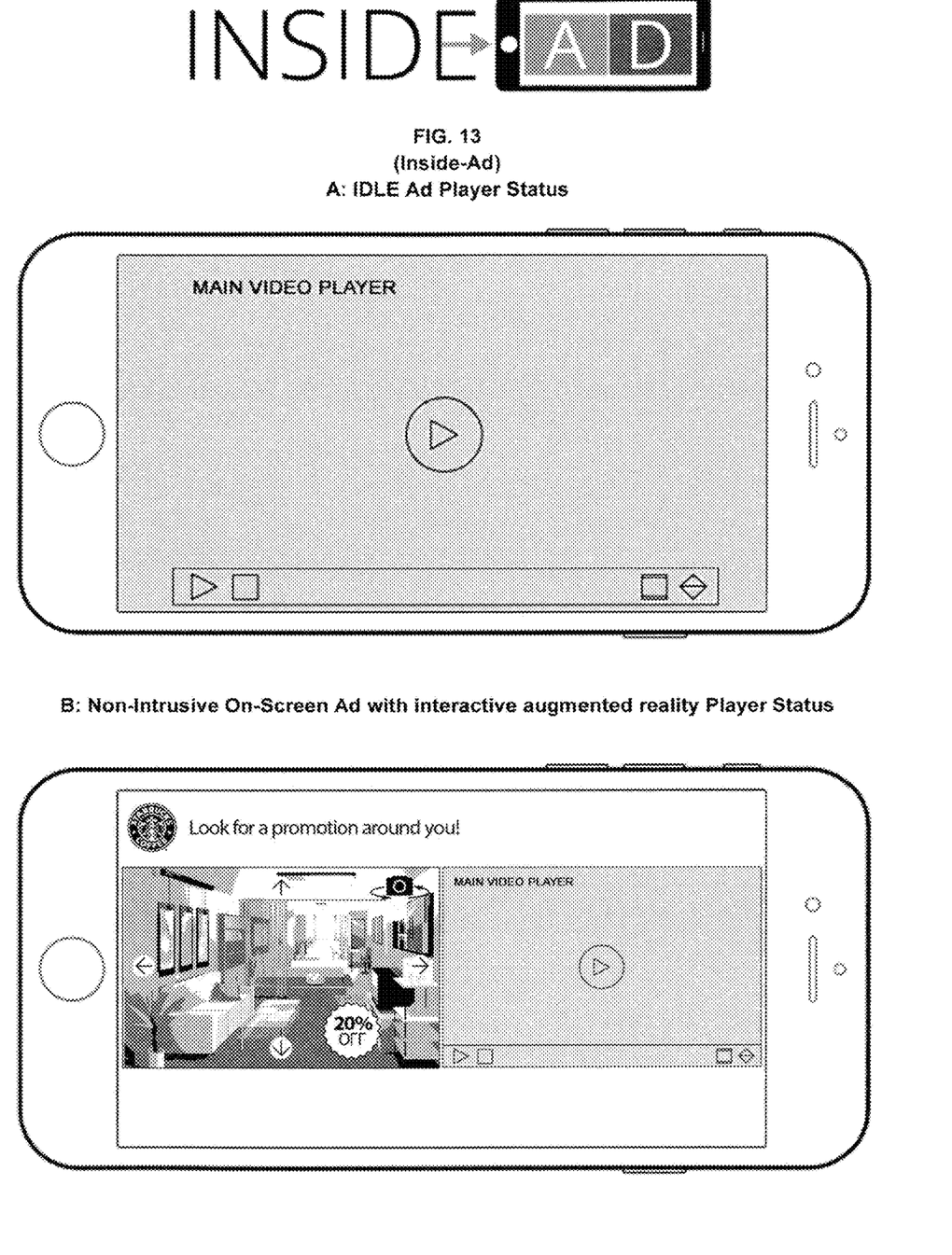

FIG. 13A depicts the main video player occupying the entire screen prior to displaying the advertisement.

FIG. 13B shows an example of interactivity between the main program and advertisement in an augmented reality experience. With the activation of the Inside-Ad advertisement according to a predefined time schedule, the main video player is placed in the right corner on the screen leaving room in the left for the Interactive Starbucks Coffee advertisement. In the left corner of the screen, the built-in smartphone camera of the viewer turns on giving the option to the viewer to look around for interactive advertisement. In this example, the user can search for a discount coupon. The viewer needs to click an it to collect the coupon and the camera goes out and the main video player then occupies the entire screen again, same as prior the inside-ad advertisement.

What is claimed is:

1. A method for displaying an inside advertisement (inside-ad) together with a primary video on a mobile device, the method comprising:
   checking, on intervals, during the playing of the primary video on the mobile device, if an inside-ad should be played during a session using inside-ad logic, wherein the inside-ad logic comprises:
      creating and posting an HTTP POST request to an inside-ad API server, wherein the HTTP POST request comprises user or session identification data;
      using the user or session identification data, deciding via the inside-ad logic if there is an available inside-ad for the session;
      checking, using inside ad logic, if the user is qualified to receive and view the inside-ad;
      compiling a JSON formatted response, wherein the JSON formatted response comprises an identification, a name, a duration, and a type of action that needs to be taken as a response to a user click action on the inside-ad and a path of the click action;
      sending, after receiving an affirmative API server response identified by the JSON content, instructions to start the inside-ad in an additional video window together with the primary video content that continues to play on the mobile device.

2. The method of claim 1, further comprising checking, after the inside-ad starts to play, if the additional information needs to be displayed in the mobile device.

3. The method of claim 1, further comprising checking if the inside-ad is finished, and if it is finished or dismissed by the user, restarting the checking on interval step.

4. The method of claim 1, wherein the user or session identification data comprises an identification (ID) of a logged in user or an IP address of a client, respectively.

\* \* \* \* \*

UNITED STATES PATENT AND TRADEMARK OFFICE
CERTIFICATE OF CORRECTION

Page 1 of 1

PATENT NO. : 11,716,499 B2
APPLICATION NO. : 15/839889
DATED : August 1, 2023
INVENTOR(S) : Antonio A. Calderon, Giovanni Punzo and Ilija Jovelvski It is certified that error appears in the above-identified patent and that said Letters Patent is hereby corrected as shown below:

On the Title Page

Item (72), replace "Jovelvski" with --Jolevski--

Signed and Sealed this
Twenty-seventh Day of August, 2024

Katherine Kelly Vidal
*Director of the United States Patent and Trademark Office*